(12) United States Patent
Kimura

(10) Patent No.: US 11,789,731 B2
(45) Date of Patent: Oct. 17, 2023

(54) TENSOR DECOMPOSITION PROCESSING SYSTEM, METHOD AND PROGRAM

(71) Applicant: NEC Corporation, Tokyo (JP)

(72) Inventor: Keigo Kimura, Tokyo (JP)

(73) Assignee: NEC CORPORATION, Tokyo (JP)

(*) Notice: Subject to any disclaimer, the term of this patent is extended or adjusted under 35 U.S.C. 154(b) by 117 days.

(21) Appl. No.: 17/430,858

(22) PCT Filed: Feb. 20, 2019

(86) PCT No.: PCT/JP2019/006301
§ 371 (c)(1),
(2) Date: Aug. 13, 2021

(87) PCT Pub. No.: WO2020/170358
PCT Pub. Date: Aug. 27, 2020

(65) Prior Publication Data
US 2022/0129263 A1    Apr. 28, 2022

(51) Int. Cl.
*G06F 9/30* (2018.01)
*G06F 18/23213* (2023.01)

(52) U.S. Cl.
CPC ...... *G06F 9/3001* (2013.01); *G06F 18/23213* (2023.01)

(58) Field of Classification Search
CPC ... G06F 9/3001; G06F 18/23213; G06F 17/16
See application file for complete search history.

(56) References Cited

U.S. PATENT DOCUMENTS

| | | | |
|---|---|---|---|
| 2011/0055379 A1* | 3/2011 | Lin | G06F 18/2323 703/2 |
| 2012/0221296 A1* | 8/2012 | Fu | G06F 17/14 702/190 |
| 2012/0278362 A1* | 11/2012 | Mande | G06F 18/24147 707/777 |
| 2016/0242690 A1* | 8/2016 | Principe | A61B 5/316 |

(Continued)

FOREIGN PATENT DOCUMENTS

| | | |
|---|---|---|
| JP | 2016031639 A | 3/2016 |
| JP | 2016173784 A | 3/2016 |

(Continued)

OTHER PUBLICATIONS

International Search Report for PCT Application No. PCT/JP2019/006301, dated May 28, 2019.

(Continued)

*Primary Examiner* — Farley Abad

(57) ABSTRACT

Provided is a tensor decomposition processing system capable of comprehensively finding factors obtained by tensor decomposition on a given tensor. A decomposition execution unit 3 executes tensor decomposition on a given tensor a plurality of times until a predetermined end condition is satisfied. A condition determination unit 5 determines whether the predetermined end condition is satisfied. When executing the tensor decomposition on the tensor, the decomposition execution unit 3 executes the tensor decomposition under a constraint of obtaining factors different from factors obtained by previous execution of the tensor decomposition.

5 Claims, 8 Drawing Sheets

(56) References Cited

U.S. PATENT DOCUMENTS

2018/0260381 A1* 9/2018 Carreras ............... G06F 40/289

FOREIGN PATENT DOCUMENTS

| JP | 2018112884 A | 7/2018 | | |
|---|---|---|---|---|
| WO | WO-2014011892 A1 * | 1/2014 | ........... | C12Q 1/6809 |

OTHER PUBLICATIONS

English translation of Written opinion for PCT Application No. PCT/JP2019/006301, dated May 28, 2019.
Hazuki Konishi et al., "Document Clustering Method Using Non-Negative Matrix Factorization", IEICE Technical Report, Feb. 26, 2015, vol. 114, No. 500, pp. 25-30.

* cited by examiner

TENSOR DECOMPOSITION PROCESSING SYSTEM, METHOD AND PROGRAM

This application is a National Stage Entry of PCT/JP2019/006301 filed on Feb. 20, 2019, the contents of all of which are incorporated herein by reference, in their entirety.

TECHNICAL FIELD

The present invention relates to a tensor decomposition processing system, a tensor decomposition processing method, and a tensor decomposition processing program for executing tensor decomposition on a given tensor.

BACKGROUND ART

Patent Literature (PTL) 1 describes obtaining, by tensor decomposition, a model for estimating the cost of a plurality of elements constituting a network.

CITATION LIST

Patent Literature

PTL 1: Japanese Patent Application Laid-Open No. 2018-112884

SUMMARY OF INVENTION

Technical Problem

Data analysis may be performed based on factors obtained by executing tensor decomposition on a tensor. However, factors suitable for data analysis are not necessarily obtainable by executing tensor decomposition once.

Moreover, initial values which are parameters used in tensor decomposition may be changed to perform the tensor decomposition again. However, an analyst cannot know to which values the initial values need to be changed in order to obtain factors suitable for data analysis.

The present invention accordingly has an object of providing a tensor decomposition processing system, a tensor decomposition processing method, and a tensor decomposition processing program capable of comprehensively finding factors obtained by tensor decomposition on a given tensor.

Solution to Problem

A tensor decomposition processing system according to the present invention includes: a decomposition execution unit for executing tensor decomposition on a given tensor a plurality of times until a predetermined end condition is satisfied; and a condition determination unit for determining whether the predetermined end condition is satisfied, wherein, when executing the tensor decomposition on the tensor, the decomposition execution unit executes the tensor decomposition under a constraint of obtaining factors different from factors obtained by previous execution of the tensor decomposition.

A tensor decomposition processing method according to the present invention executed by a computer, including: executing tensor decomposition on a given tensor a plurality of times until a predetermined end condition is satisfied; determining whether the predetermined end condition is satisfied; and when executing the tensor decomposition on the tensor, executing the tensor decomposition under a constraint of obtaining factors different from factors obtained by previous execution of the tensor decomposition.

A tensor decomposition processing program according to the present invention causes a computer to execute: a decomposition execution process of executing tensor decomposition on a given tensor a plurality of times until a predetermined end condition is satisfied; and a condition determination process of determining whether the predetermined end condition is satisfied, wherein, when executing the tensor decomposition on the tensor in the decomposition execution process, the computer executes the tensor decomposition under a constraint of obtaining factors different from factors obtained by previous execution of the tensor decomposition.

Advantageous Effects of Invention

According to the present invention, it is possible to comprehensively find factors obtained by tensor decomposition on a given tensor.

DESCRIPTION OF EMBODIMENT

First, tensor decomposition will be described below. Tensor decomposition is to represent a tensor by a combination of factors for expressing tensors lower in rank.

An example of tensor decomposition is canonical polyadic (CP) decomposition. Tensor decomposition will be described below, using CP decomposition as an example.

A tensor subjected to tensor decomposition is a tensor of order 2 or more. Hereafter, a tensor subjected to tensor decomposition is denoted by X. An example in which the tensor X is a tensor of order 3 will be described below, for simplicity's sake.

The tensor X can be approximated according to the following Formula (1).

[Math. 1]

$$X \approx I \times_1 A \times_2 B \times_3 C \quad (1)$$

In Formula (1), A, B, and C are each a matrix. In the case where X is a tensor of order 3, X is approximated using three matrices A, B, and C. In the case where X is a tensor of order N, X is approximated using N matrices. In Formula (1), the values at the lower left of the matrices A, B, and C indicate from which direction the matrices are multiplied with respect to a core tensor I. The same applies to the below-described examples.

I is a core tensor. The elements of the core tensor I are represented as follows.

[Math. 2]

$$I_{j_1 j_2 j_3} = \begin{cases} 1 & j_1 = j_2 = j_3 \\ 0 & \text{otherwise} \end{cases}.$$

Here, it is assumed that the following Formula (2) holds.

[Math. 3]

$$\begin{cases} A \in R^{I_1 \times J} \\ B \in R^{I_2 \times J} \\ C \in R^{I_3 \times J} \\ I \in R^{J \times J \times J} \\ X \in R^{I_1 \times I_2 \times I_3} \end{cases} \quad (2)$$

In detail, A is a matrix of $I_1$ rows and J columns. B is a matrix of $I_2$ rows and J columns. C is a matrix of $I_3$ rows and J columns. Thus, each matrix used in the approximation of the tensor has the same number of columns. Herein, the number of columns is denoted by J. In the case of depicting a matrix or a column vector included in a matrix, the matrix or the column vector may be depicted in a transposed state, for convenience's sake.

Figure 1:
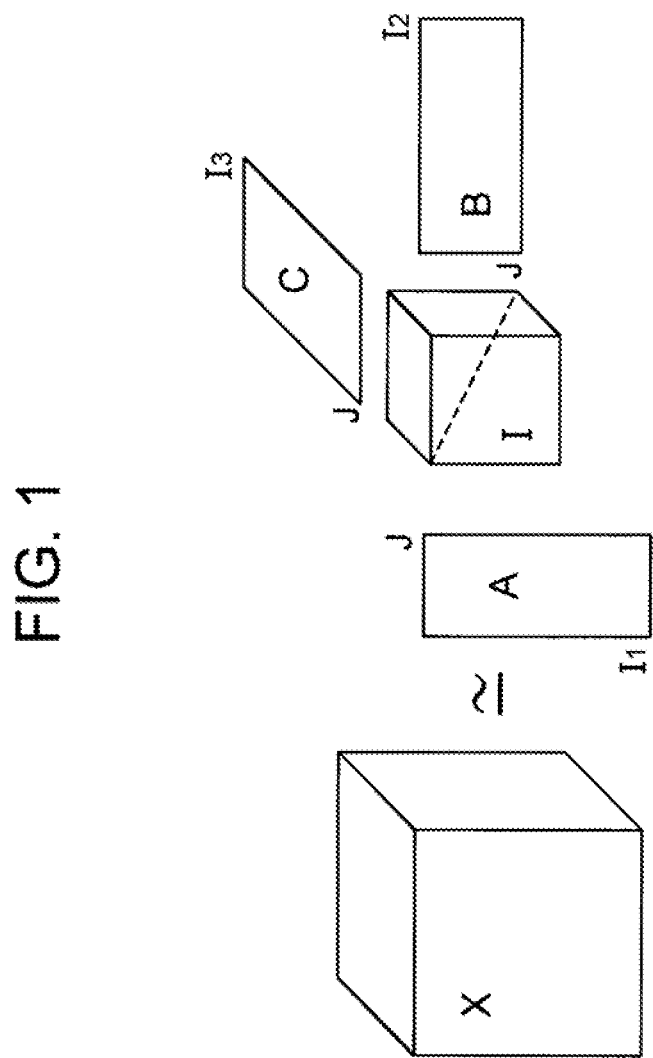
FIG. 1 It is a schematic diagram representing Formula (1) that indicates approximation of a tensor X.

Formula (1) can be represented as schematically depicted in FIG. 1. In FIG. 1, the matrices B and C are each depicted in a transposed state, for convenience's sake.

A combination of the column vectors of the corresponding columns in a plurality of matrices used for approximation of a tensor is called a factor. For example, a combination of the column vector of the first column in A, the column vector of the first column in B, and the column vector of the first column in C is one factor. Likewise, a combination of the column vector of the second column in A, the column vector of the second column in B, and the column vector of the second column in C is one factor. Further, a combination of the column vector of the J-th column in A, the column vector of the J-th column in B, and the column vector of the J-th column in C is one factor. While the first column, the second column, and the J-th column in each matrix are described here as an example, one factor is equally determined for each of the other columns. The matrices A, B, and C each include J column vectors from the column vector of the first column to the column vector of the J-th column. Hence, J factors are obtained.

Outer product calculation on the column vectors included in one factor yields a tensor lower in rank than X. For example, let the column vector of the first column in A be $A_1$, the column vector of the first column in B be $B_1$, and the column vector of the first column in C be $C_1$. Then, the following outer product calculation yields a tensor.

$$A_1 \bigcirc B_1 \bigcirc C_1 \qquad \text{[Math. 4]}$$

Herein, the outer product calculation is expressed by the following symbol.

$$\bigcirc \qquad \text{[Math. 5]}$$

Figure 2:
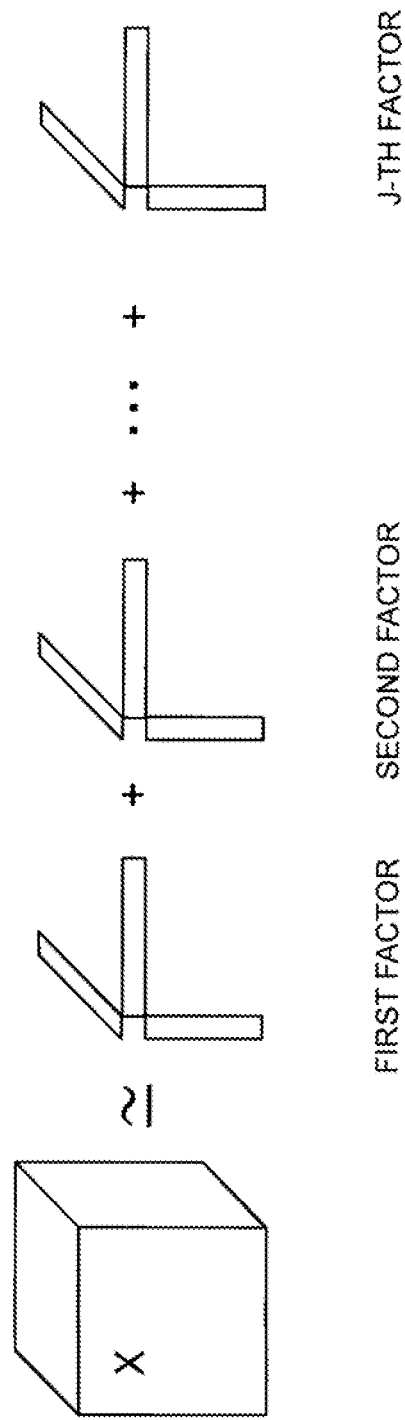
FIG. 2 It is a schematic diagram depicting approximation of the tensor X by the sum of tensors obtained from J factors.

The tensor X subjected to tensor decomposition can be approximated by the sum of the tensors obtained from the J factors. This is schematically depicted in FIG. 2.

Tensor decomposition is to represent a tensor by a combination of factors for expressing tensors lower in rank, as mentioned above. Here, the number of combinations of J factors obtained by tensor decomposition on one tensor X is not limited to one.

The number J of factors is a predetermined value.

As described above, the present invention has an object of comprehensively finding factors obtained by tensor decomposition on a given tensor.

Exemplary embodiments of the present invention will be described below, with reference to the drawings.

Exemplary Embodiment 1

Figure 3:
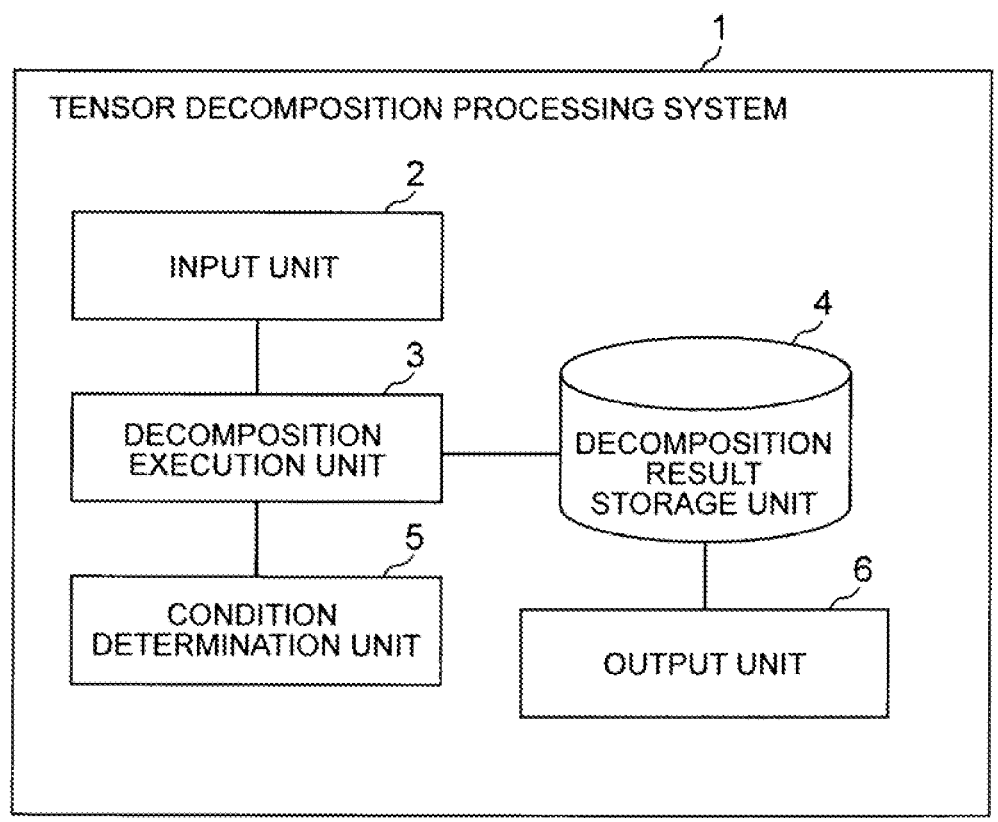
FIG. 3 It is a block diagram depicting an example of a tensor decomposition processing system according to Exemplary Embodiment 1 of the present invention.

FIG. 3 is a block diagram depicting an example of a tensor decomposition processing system according to Exemplary Embodiment 1 of the present invention. A tensor decomposition processing system 1 according to the present invention includes an input unit 2, a decomposition execution unit 3, a decomposition result storage unit 4, a condition determination unit 5, and an output unit 6.

The input unit 2 is an input device that receives, as input, a tensor X subjected to tensor decomposition, the number J of factors obtained by one tensor decomposition, a weight λ, and an end condition for tensor decomposition repeatedly executed on the tensor X by the decomposition execution unit 3. For example, the input unit 2 may be an input device such as a data reading device (for example, optical disc drive) for reading the tensor X, the number J of factors obtained by one tensor decomposition, the weight λ, and the end condition from a data recording medium.

The tensor X subjected to tensor decomposition is a tensor of order 2 or more.

The weight λ is used in a constraint when the decomposition execution unit 3 executes tensor decomposition on the tensor X. The constraint will be described later.

Specific examples of the end condition will also be described later.

The decomposition execution unit 3 executes tensor decomposition on the input tensor X a plurality of times until the end condition is satisfied. The decomposition execution unit 3 may execute CP decomposition as the tensor decomposition.

When executing tensor decomposition on the tensor X, the decomposition execution unit 3 executes the tensor decomposition under the constraint of obtaining factors different from the factors obtained by the tensor decomposition previously executed on the tensor X. For example, when executing the second tensor decomposition on the tensor X, the decomposition execution unit 3 executes the second tensor decomposition under the constraint of obtaining factors different from the factors obtained by the first tensor decomposition on the tensor X. For example, when executing the third tensor decomposition on the tensor X, the decomposition execution unit 3 executes the third tensor decomposition under the constraint of obtaining factors different from the factors obtained by the first tensor decomposition and the second tensor decomposition on the tensor X. Thus, the decomposition execution unit 3 obtains different factors in each tensor decomposition on the tensor X.

The constraint when the decomposition execution unit 3 executes tensor decomposition on the tensor X will be described in detail below. In the following example, X is a tensor of order 3, and the number of matrices defining J factors is 3, as in the foregoing example. The three matrices are referred to as "matrices A, B, and C", as in the foregoing example. The number of columns in each of the matrices A, B, and C is J.

The constraint when the decomposition execution unit 3 executes the T-th tensor decomposition on the tensor X can be expressed by the following Formula (3).

[Math. 6]

$$\min_{A^{(t)}, B^{(t)}, C^{(t)}} \left( \sum_{t=1}^{T} \| X - I \times_1 A^{(t)} \times_2 B^{(t)} \times_3 C^{(t)} \| + \lambda \sum_{\tau=1}^{t-1} \Omega(\{A^{(\tau)}, B^{(\tau)}, C^{(\tau)}\}, \{A^{(t)}, B^{(t)}, C^{(t)}\}) \right) \quad (3)$$

In Formula (3), the upper right parenthesized superscript of each of the matrices A, B, and C indicates the ordinal number of the tensor decomposition on X that yields the matrix. For example, $A^{(t)}$, $B^{(t)}$, and $C^{(t)}$ denote the matrices A, B, and C obtained by the t-th tensor decomposition on X.

The following Formula (4) included in Formula (3) indicates the degree to which the original tensor X can be approximated by the factors obtained by the tensor decomposition.

[Math. 7]

$$\sum_{t=1}^{T} \| X - I \times_1 A^{(t)} \times_2 B^{(t)} \times_3 C^{(t)} \| \quad (4)$$

A smaller value of Formula (4) indicates that the original tensor X is approximated with higher accuracy by the factors obtained by the tensor decomposition. A larger value of Formula (4) indicates that the tensor X is approximated with lower accuracy by the factors obtained by the tensor decomposition.

The following Formula (5) included in Formula (3) indicates the degree to which the factors obtained by the t-th tensor decomposition and the factors obtained by each of the first to (t−1)th tensor decompositions are different from each other.

[Math. 8]

$$\lambda \sum_{\tau=1}^{t-1} \Omega(\{A^{(\tau)}, B^{(\tau)}, C^{(\tau)}\}, \{A^{(t)}, B^{(t)}, C^{(t)}\}) \quad (5)$$

A smaller value of Formula (5) indicates that the factors obtained by the t-th tensor decomposition and the factors obtained by each of the first to (t−1)th tensor decompositions are more different from each other. A larger value of Formula (5) indicates that the factors obtained by the t-th tensor decomposition and the factors obtained by each of the first to (t−1)th tensor decompositions are more similar to each other.

The operation $\Omega(\{A^{(\tau)}, B^{(\tau)}, C^{(\tau)}\}, \{A^{(t)}, B^{(t)}, C^{(t)}\})$ (hereafter simply referred to as "operation Ω") in Formula (5) is an operation that yields a smaller value when the factors obtained by the t-th tensor decomposition and the factors obtained by each of the first to (t−1)th tensor decompositions are more different from each other and a larger value when the factors obtained by the t-th tensor decomposition and the factors obtained by each of the first to (t−1)th tensor decompositions are more similar to each other.

A specific example of such operation Ω is an operation expressed by the following Formula (6).

[Math. 9]

$$\Omega = -\sum_{k=1}^{J} \sum_{\tau=1}^{t-1} \sum_{j=1}^{J} \left\| \left( A_j^{(\tau)} \circ B_j^{(\tau)} \circ C_j^{(\tau)} \right) - \left( A_k^{(t)} \circ B_k^{(t)} \circ C_k^{(t)} \right) \right\| \quad (6)$$

In Formula (6), A with the lower right subscript denotes the column vector of the matrix A, where the lower right subscript indicates which column in the matrix A the column vector corresponds to. For example, "$A_k^{(t)}$" in Formula (6) denotes the column vector of the k-th column in the matrix A obtained by the t-th tensor decomposition.

The same applies to B and C each with the lower right subscript. That is, each of B and C with the lower right subscript denotes the column vector.

The following symbol expresses outer product calculation, as mentioned above.

○ [Math. 10]

Formula (3) represents the constraint of obtaining such matrices A, B, and C that minimize the sum of Formula (4) and Formula (5). Herein, obtaining the matrices A, B, and C is synonymous with obtaining the J factors.

The constraint represented by Formula (3) means the constraint of, in the T-th tensor decomposition, obtaining factors that can approximate the tensor X and that are different from the factors obtained in the previous (i.e. past) tensor decomposition. The weight λ input to the input unit 2 is the weight relating to the constraint of obtaining factors different from the factors obtained in the previous tensor decomposition.

The decomposition execution unit 3 sets the value of "T" in Formula (3) depending on the number of times tensor decomposition is performed on the tensor X, thus updating the constraint of the tensor decomposition. For example, in the case where the next tensor decomposition is the S-th tensor decomposition, the decomposition execution unit 3 assigns S to "T" in Formula (3) to update the constraint.

Moreover, each time the decomposition execution unit 3 executes tensor decomposition on the tensor X, the decomposition execution unit 3 stores the factors obtained as a result of the tensor decomposition in the decomposition result storage unit 4.

The decomposition result storage unit 4 is a storage device for storing the factors obtained as a result of the tensor decomposition.

The condition determination unit 5 determines whether an end condition for the tensor decomposition repeatedly executed on the tensor X by the decomposition execution unit 3 is satisfied. After the condition determination unit 5 determines that the end condition is satisfied, the decomposition execution unit 3 no longer performs the tensor decomposition on the tensor X.

An example of the end condition is that the number of times the decomposition execution unit 3 executes tensor decomposition on the tensor X reaches a predetermined number.

Another example of the end condition is that such J factors that limit the value of Formula (4) to not greater than a threshold (denoted by α) are not obtained in the most recent tensor decomposition on the tensor X. A failure to obtain such J factors that limit the value of Formula (4) to not greater than the threshold $\alpha$ in the most recent tensor decomposition on the tensor X means that the accuracy in approximating the tensor X by the obtained factors has lowered to an unacceptable level. The threshold $\alpha$ may be predetermined.

Another example of the end condition is that such J factors that limit the value of Formula (5) to not greater than a threshold (denoted by $\beta$) are not obtained in the most recent tensor decomposition on the tensor X. A failure to obtain such J factors that limit the value of Formula (5) to not greater than the threshold $\beta$ in the most recent tensor decomposition on the tensor X means that factors different from the factors obtained in the tensor decomposition executed in the past have become unable to be obtained. The threshold $\beta$ may be predetermined.

The end condition may be any condition other than these conditions described as examples.

The end condition is predetermined, and is input to the input unit 2.

The output unit 6 outputs each factor stored in the decomposition result storage unit 4 (i.e. each factor obtained in each tensor decomposition), after the condition determination unit 5 determines that the end condition is satisfied. For example, the output unit 6 displays each factor on a display device (not depicted in FIG. 3) included in the tensor decomposition processing system 1.

The decomposition execution unit 3, the condition determination unit 5, and the output unit 6 are, for example, implemented by a central processing unit (CPU) in a computer operating according to a tensor decomposition processing program. For example, the CPU may read the tensor decomposition processing program from a program recording medium such as a program storage device in the computer and, according to the tensor decomposition processing program, operate as the decomposition execution unit 3, the condition determination unit 5, and the output unit 6. The decomposition result storage unit 4 is, for example, implemented by a storage device included in the computer.

Figure 4:
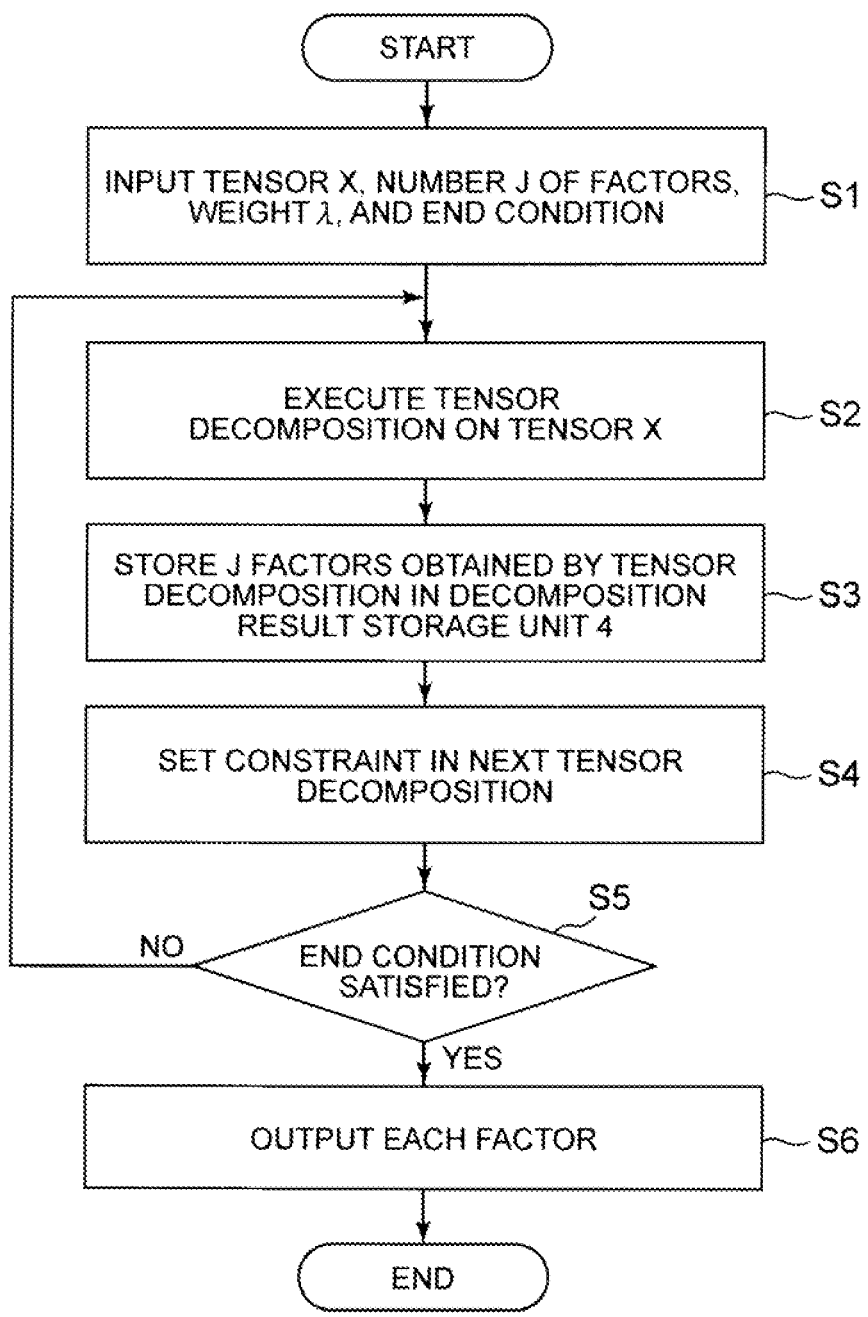
FIG. 4 It is a flowchart depicting an example of a process by the tensor decomposition processing system according to Exemplary Embodiment 1 of the present invention.

Processes will be described below. FIG. 4 is a flowchart depicting an example of a process by the tensor decomposition processing system according to Exemplary Embodiment 1 of the present invention.

First, the tensor X, the number J of factors obtained by one tensor decomposition, the weight $\lambda$, and the end condition are input to the input unit 2 (step S1).

Next, the decomposition execution unit 3 executes tensor decomposition on the tensor X (step S2). In the first tensor decomposition (i.e. the first step S2), the decomposition execution unit 3 may execute the tensor decomposition on the tensor X with no constraint.

In this example, J factors are obtained by one tensor decomposition on X. After step S2, the decomposition execution unit 3 stores the J factors obtained by the tensor decomposition in step S2, in the decomposition result storage unit 4 (step S3).

After step S3, the decomposition execution unit 3 sets a constraint for the next tensor decomposition on the tensor X (step S4). In the case where the next tensor decomposition (step S2) on the tensor X is the S-th tensor decomposition (step S2), the decomposition execution unit 3 assigns S to "T" in Formula (3) representing the constraint, to set the constraint for the next tensor decomposition. For example, in the case where the next tensor decomposition is the second tensor decomposition, 2 is assigned to "T" in Formula (3) representing the constraint, thus setting the constraint in the next step S2.

After step S4, the condition determination unit 5 determines whether the end condition input in step S1 is satisfied (step S5).

In the case where the end condition is not satisfied (step S5: No), the decomposition execution unit 3 repeats the process from step S2. When executing step S2 the second and subsequent times, the decomposition execution unit 3 executes tensor decomposition on the tensor X again under the constraint set in the most recent step S4. In detail, the decomposition execution unit 3 executes tensor decomposition on the tensor X again under the constraint of obtaining factors different from the factors obtained in the past tensor decomposition (i.e. the past step S2).

The tensor decomposition processing system 1 repeats the process in steps S2 to S5, until the condition determination unit 5 determines that the end condition is satisfied in step S5.

In the case where the condition determination unit 5 determines that the end condition is satisfied (step S5: Yes), the output unit 6 outputs each factor stored in the decomposition result storage unit 4 (step S6). For example, the output unit 6 displays each factor on a display device (not depicted in FIG. 3) included in the tensor decomposition processing system 1. An example in which the output unit 6 displays each factor on the display device will be described below.

Figure 5:
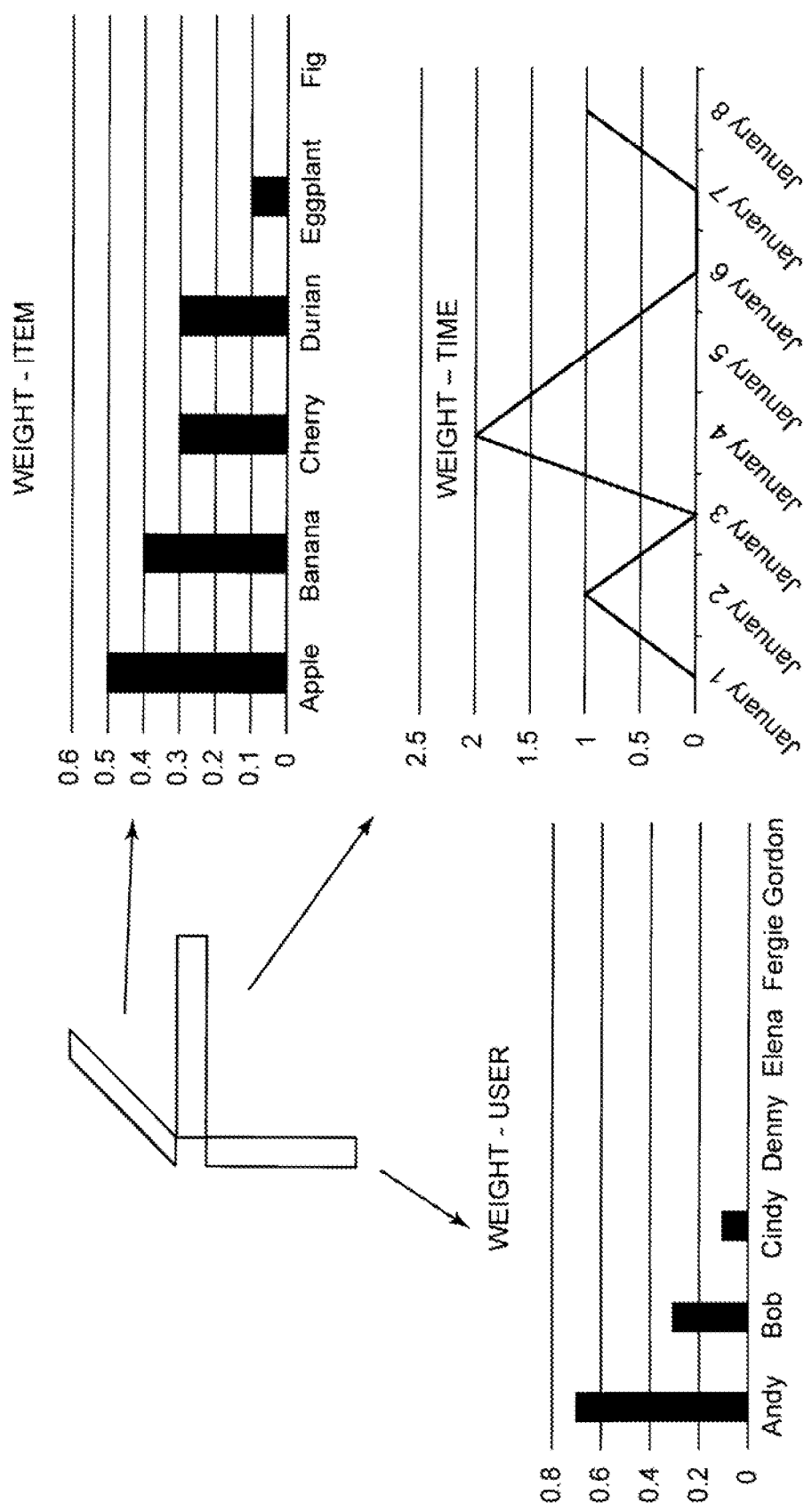
FIG. 5 It is a schematic diagram depicting an example of graphs displayed based on each column vector included in a factor.

When displaying one factor, the output unit 6 may display graphs based on each column vector included in the factor. FIG. 5 depicts an example of graphs displayed based on each column vector included in one factor. FIG. 5 depicts an example in which one factor includes three column vectors and three graphs are displayed based on the one factor.

According to this exemplary embodiment, the tensor decomposition processing system 1 repeatedly performs the process in steps S2 to S5 until the condition determination unit 5 determines that the end condition is satisfied. In step S2, the decomposition execution unit 3 executes tensor decomposition on the tensor X under the constraint of obtaining factors different from the factors obtained in the past tensor decomposition. Therefore, according to this exemplary embodiment, it is possible to comprehensively find factors obtained by tensor decomposition on the given tensor X.

Consequently, an analyst can recognize each of the individual factors obtained comprehensively in this way, and select a factor appropriate for data analysis. That is, the analyst can obtain a factor suitable for data analysis. When recognizing each individual factor, the analyst may determine a factor appropriate for data analysis by checking displayed graphs as depicted in FIG. 5.

Exemplary Embodiment 2

Figure 6:
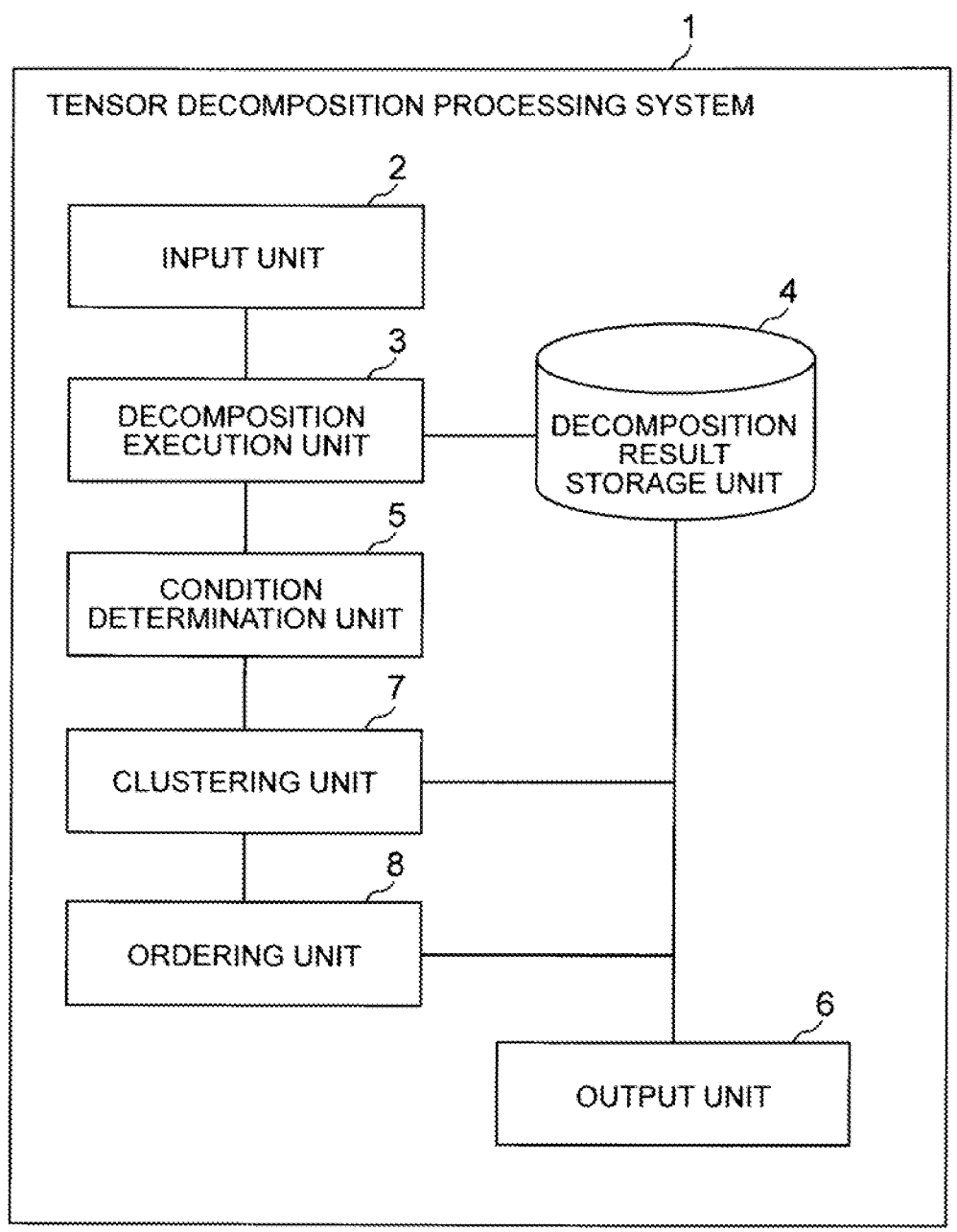
FIG. 6 It is a block diagram depicting an example of a tensor decomposition processing system according to Exemplary Embodiment 2 of the present invention.

FIG. 6 is a block diagram depicting an example of a tensor decomposition processing system according to Exemplary Embodiment 2 of the present invention. The same elements as those in Exemplary Embodiment 1 are given the same reference signs as in FIG. 3, and their description is omitted.

A tensor decomposition processing system 1 according to Exemplary Embodiment 2 includes the input unit 2, the decomposition execution unit 3, the decomposition result storage unit 4, the condition determination unit 5, a clustering unit 7, an ordering unit 8, and the output unit 6. The input unit 2, the decomposition execution unit 3, the decomposition result storage unit 4, and the condition determination unit 5 are the same as those in Exemplary Embodiment 1, and their description is omitted.

The clustering unit 7 performs clustering on the factors obtained until the condition determination unit 5 determines that the end condition is satisfied, to classify the plurality of factors into clusters. J factors are obtained by one tensor decomposition on the tensor X. In the case where tensor decomposition is executed P times until the condition determination unit 5 determines that the end condition is satisfied, J×P factors are obtained, and stored in the decomposition result storage unit 4. The clustering unit 7 reads the factors from the decomposition result storage unit 4, and classifies the read factors into a plurality of clusters.

The clustering unit 7 clusters the factors read from the decomposition result storage unit 4 so that similar factors will belong to the same cluster. An example of a method of performing clustering so that similar factors will belong to the same cluster is a k-means method. The clustering unit 7 may cluster the factors read from the decomposition result storage unit 4 (i.e. a plurality of factors obtained by performing tensor decomposition on the tensor X a plurality of times) by the k-means method.

The ordering unit 8 orders, for each cluster obtained by the clustering unit 7, the factors belonging to the cluster. A criterion in ordering the factors is the degree of contribution to the approximation of the given tensor X. In detail, the ordering unit 8 orders the factors belonging to the cluster in descending order of the degree of contribution to the approximation of the given tensor X.

The degree of contribution to the approximation of the given tensor X will be described below. Let Y be a tensor obtained from a factor of interest. Y is obtained by outer product calculation on the column vectors included in the factor. The degree of contribution to the approximation of the tensor X can be expressed as $\|X-Y\|$. When $\|X-Y\|$ is smaller, the degree of contribution to the approximation of the tensor X is higher. When $\|X-Y\|$ is larger, the degree of contribution to the approximation of the tensor X is lower. Hence, the ordering unit 8 calculates $\|X-Y\|$ for each of the factors belonging to one cluster, and orders the factors belonging to the cluster in ascending order of $\|X-Y\|$. The ordering unit 8 performs this process for each cluster.

The output unit 6 displays each factor stored in the decomposition result storage unit 4 on a display device (not depicted in FIG. 6), as in Exemplary Embodiment 1.

The output unit 6 further displays, for each cluster, the factors belonging to the cluster, on the display device. Here, the output unit 6 displays the factors in each cluster in the order determined by the ordering unit 8, on the display device.

The decomposition execution unit 3, the condition determination unit 5, the clustering unit 7, the ordering unit 8, and the output unit 6 are, for example, implemented by a CPU in a computer operating according to a tensor decomposition processing program. For example, the CPU may read the tensor decomposition processing program from a program recording medium such as a program storage device in the computer and, according to the tensor decomposition processing program, operate as the decomposition execution unit 3, the condition determination unit 5, the clustering unit 7, the ordering unit 8, and the output unit 6.

Figure 7:
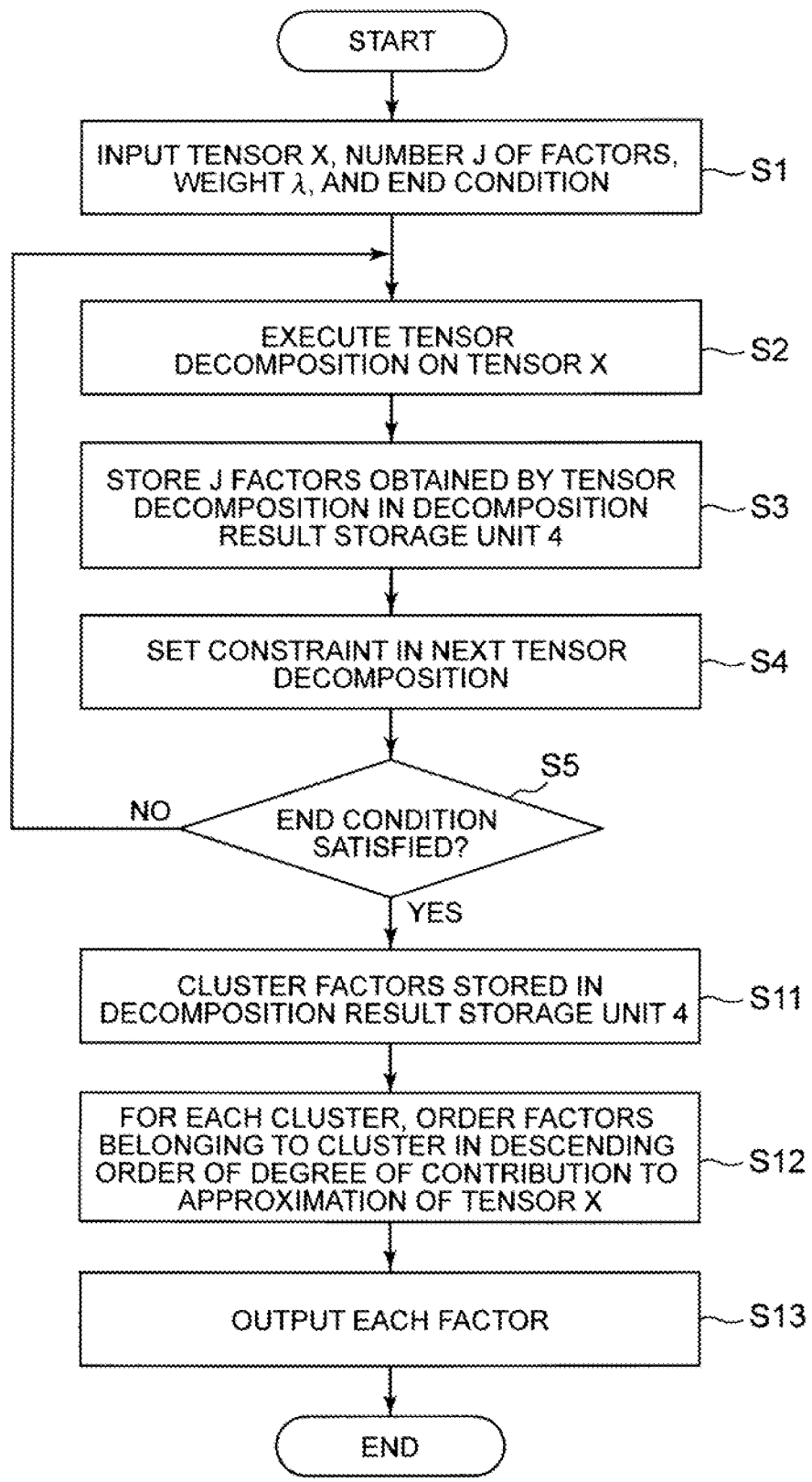
FIG. 7 It is a flowchart depicting an example of a process by the tensor decomposition processing system according to Exemplary Embodiment 2 of the present invention.

FIG. 7 is a flowchart depicting an example of a process by the tensor decomposition processing system according to Exemplary Embodiment 2 of the present invention. Steps S1 to S5 are the same as steps S1 to S5 in Exemplary Embodiment 1, and their description is omitted.

In the case where the condition determination unit 5 determines that the end condition is satisfied in step S5 (step S5: Yes), the clustering unit 7 clusters factors obtained by performing tensor decomposition on the tensor X a plurality of times (step S11). Specifically, the clustering unit 7 reads the factors stored in the decomposition result storage unit 4, and clusters the factors. The clustering unit 7 may, for example, cluster the factors by the k-means method. As a result of step S11, a plurality of clusters are obtained. Each cluster has similar factors.

Next, for each cluster obtained in step S11, the ordering unit 8 orders the factors belonging to the cluster in descending order of the degree of contribution to the approximation of the tensor X (step S12). As mentioned earlier, when a tensor obtained from a factor of interest is denoted by Y, the ordering unit 8 calculates $\|X-Y\|$ for each of the factors belonging to one cluster, and orders the factors belonging to the cluster in ascending order of $\|X-Y\|$. The ordering unit 8 performs this process for each cluster.

Following step S12, the output unit 6 displays each factor stored in the decomposition result storage unit 4, on the display device. The output unit 6 further displays, for each cluster, the factors belonging to the cluster, on the display device. Here, the output unit 6 displays the factors in each cluster in the order determined by the ordering unit 8, on the display device (step S13).

In step S13, in the case of performing the process of displaying, for each cluster, the factors in the determined order on the display device, the process of displaying each factor on the display device regardless of the cluster may be omitted.

When displaying one factor, the output unit 6 may display graphs based on each column vector included in the factor, as described in Exemplary Embodiment 1.

According to this exemplary embodiment, the same effects as in Exemplary Embodiment 1 can be achieved. Moreover, according to Exemplary Embodiment 2, similar factors are classified into the same cluster, with it being possible to improve the easiness in interpretation of factors. The effect of helping the analyst understand the overall data can also be achieved.

Furthermore, according to Exemplary Embodiment 2, the ordering unit 8 orders, for each cluster, the factors belonging to the cluster in descending order of the degree of contribution to the approximation of the tensor X. This enables the analyst to know which factor is important.

Figure 8:
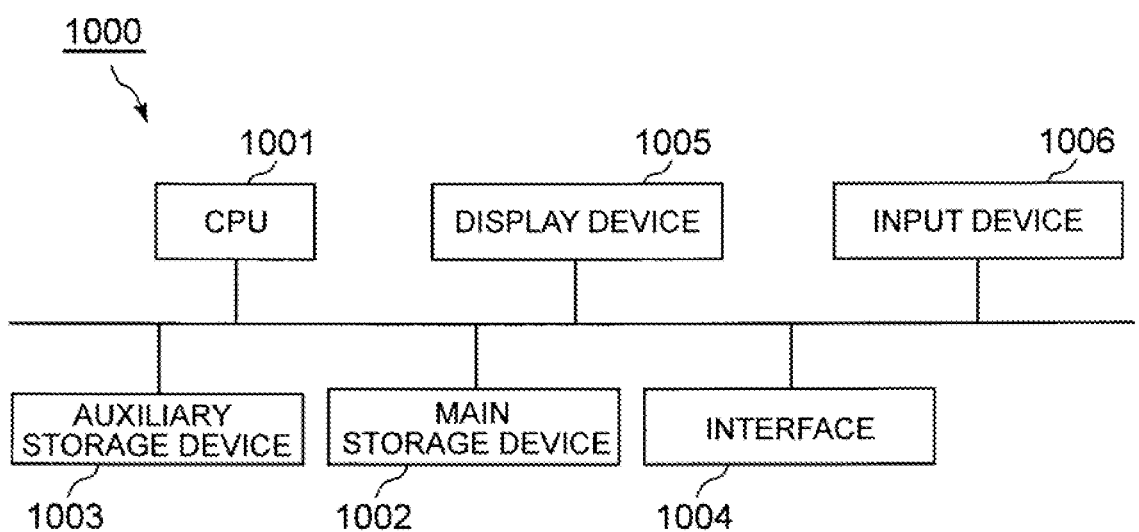
FIG. 8 It is a schematic block diagram depicting an example of the structure of a computer relating to a tensor decomposition processing system according to each exemplary embodiment of the present invention.

FIG. 8 is a schematic block diagram depicting an example of the structure of a computer relating to the tensor decomposition processing system 1 according to each exemplary embodiment of the present invention. A computer 1000 includes a CPU 1001, a main storage device 1002, an auxiliary storage device 1003, an interface 1004, a display device 1005, and an input device 1006.

The tensor decomposition processing system 1 according to each exemplary embodiment of the present invention is implemented by the computer 1000. The operation of the tensor decomposition processing system 1 is stored in the auxiliary storage device 1003 in the form of a tensor decomposition processing program. The CPU 1001 reads the tensor decomposition processing program from the auxiliary storage device 1003, expands the tensor decomposition processing program in the main storage device 1002, and executes the process described in each exemplary embodiment according to the tensor decomposition processing program.

The auxiliary storage device 1003 is an example of a non-transitory tangible medium. Examples of the non-transitory tangible medium include a magnetic disk, magneto-optical disk, compact disk read only memory (CD-ROM), digital versatile disk read only memory (DVD-ROM), and semiconductor memory connected via the interface 1004. In the case where the program is distributed to the computer 1000 through a communication line, the computer 1000 to which the program has been distributed may expand the program in the main storage device 1002 and, according to the program, execute the process described in each exemplary embodiment.

The program may realize part of the aforementioned process. The program may be a differential program that realizes the aforementioned process in combination with another program already stored in the auxiliary storage device 1003.

All or part of the components may be implemented by general-purpose or dedicated circuitry, processors, or combinations thereof. They may be configured with a single chip, or configured with a plurality of chips connected via a bus. All or part of the components may be implemented by a combination of the above-mentioned circuitry or the like and program.

In the case where all or part of the components is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-server system or a cloud computing system.

Figure 9:
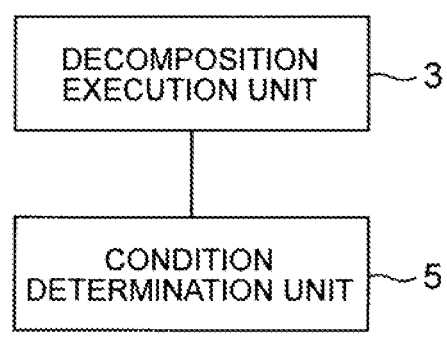
FIG. 9 It is a block diagram depicting an overview of a tensor decomposition processing system according to the present invention.

An overview of the present invention will be described below. FIG. 9 is a block diagram depicting an overview of a tensor decomposition processing system according to the present invention. The tensor decomposition processing system according to the present invention includes a decomposition execution unit 3 and a condition determination unit 5.

The decomposition execution unit 3 executes tensor decomposition on a given tensor a plurality of times until a predetermined end condition is satisfied.

The condition determination unit 5 determines whether the predetermined end condition is satisfied.

When executing the tensor decomposition on the tensor, the decomposition execution unit 3 executes the tensor decomposition under a constraint of obtaining factors different from factors obtained by previous execution of the tensor decomposition.

With such a structure, it is possible to comprehensively find factors obtained by tensor decomposition on a given tensor.

The tensor decomposition processing system may include a clustering unit (for example, the clustering unit 7) for clustering factors obtained by executing the tensor decomposition on the given tensor the plurality of times.

The clustering unit may cluster the factors by a k-means method.

The tensor decomposition processing system may include an ordering unit (for example, the ordering unit 8) for ordering, for each cluster, factors belonging to the cluster in order of contribution to approximation of the given tensor.

The ordering unit may order, for each cluster, the factors belonging to the cluster in ascending order of $\|X-Y\|$, where X is the given tensor, and Y is each individual factor.

Although the present invention has been described with reference to the exemplary embodiments, the present invention is not limited to the foregoing exemplary embodiments. Various changes understandable by those skilled in the art can be made to the structures and details of the present invention within the scope of the present invention.

INDUSTRIAL APPLICABILITY

The present invention is suitable for use in acquiring factors by tensor decomposition.

REFERENCE SIGNS LIST

1 tensor decomposition processing system
2 input unit
3 decomposition execution unit
4 decomposition result storage unit
5 condition determination unit
6 6 output unit
7 clustering unit
8 ordering unit

What is claimed is:

1. A tensor decomposition processing system comprising:
a memory configured to store instructions; and
a processor configured to execute the instructions to:
execute tensor decomposition on a given tensor a plurality of times until a predetermined end condition is satisfied; and
determine whether the predetermined end condition is satisfied,
wherein, when executing the tensor decomposition on the given tensor, the processor executes the tensor decomposition under a constraint of obtaining factors different from the factors as obtained by previous execution of the tensor decomposition,
wherein the processor
clusters the factors obtained by executing the tensor decomposition on the given tensor the plurality of times into a plurality of clusters; and
orders, for each cluster, the factors belonging to the cluster in order of contribution to approximation of the given tensor.

2. The tensor decomposition processing system according to claim 1, wherein the processor clusters the factors by using a k-means method.

3. The tensor decomposition processing system according to claim 1, wherein the processor orders, for each cluster, the factors belonging to the cluster in ascending order of $\|X-Y\|$, where X is the given tensor, and Y is a tensor obtained from each factor individually.

4. A tensor decomposition processing method executed by a computer, the tensor decomposition processing method comprising:
executing tensor decomposition on a given tensor a plurality of times until a predetermined end condition is satisfied;
determining whether the predetermined end condition is satisfied;
when executing the tensor decomposition on the given tensor, executing the tensor decomposition under a constraint of obtaining factors different from the factors as obtained by previous execution of the tensor decomposition;
clustering factors obtained by executing the tensor decomposition on the given tensor the plurality of times into a plurality of clusters; and
ordering, for each cluster, the factors belonging to the cluster in order of contribution to approximation of the given tensor.

5. A non-transitory computer-readable recording medium in which a tensor decomposition processing program is recorded, the tensor decomposition processing program executable by a computer to cause the computer to execute processes of:
- executing tensor decomposition on a given tensor a plurality of times until a predetermined end condition is satisfied;
- determining whether the predetermined end condition is satisfied,
- wherein, when executing the tensor decomposition on the given tensor, the computer executes the tensor decomposition under a constraint of obtaining factors different from the factors as obtained by previous execution of the tensor decomposition;
- clustering factors obtained by executing the tensor decomposition on the given tensor the plurality of times into a plurality of clusters; and
- ordering, for each cluster, factors belonging to the cluster in order of contribution to approximation of the given tensor.

* * * * *